United States Patent

[11] 3,585,316

[72] Inventor K. Karl Kuller
West Milford Township, N.J.
[21] Appl. No. 831,947
[22] Filed June 10, 1969
[45] Patented June 15, 1971
[73] Assignee The United States of America as represented by the Secretary of the Navy

[54] LOW-SPEED HIGH-FREQUENCY TAPE RECORDER WITH RECIPROCATING HEAD AND MEDIUM
2 Claims, 3 Drawing Figs.

[52] U.S. Cl. .......... 179/100.2T, 340/174.1
[51] Int. Cl. .......... G11b 5/52, G11b 21/04
[50] Field of Search .......... 179/100.2 T, 100.3 B; 340/174.1

[56] References Cited
UNITED STATES PATENTS

| | | | |
|---|---|---|---|
| 2,986,725 | 5/1961 | Dirks | 179/100.2 |
| 3,012,106 | 12/1961 | Brenner | 179/100.2 |
| 3,251,263 | 5/1966 | Gerry | 179/100.2 |

FOREIGN PATENTS

| | | | |
|---|---|---|---|
| 1,041,699 | 4/1951 | France | 179/100.2 |

*Primary Examiner*—Bernard Konick
*Assistant Examiner*—J. Russell Goudeau
*Attorneys*—Joseph C. Warfield, John W. Pease and John F. Miller

ABSTRACT: Apparatus for transverse recording across a moving magnetic tape. The tape is moved in the direction of its length through a guide which is reciprocated in a direction parallel to the plane of the tape and perpendicular to the length of the tape. The magnetic head is also reciprocated in a direction parallel to the plane of the tape but in opposition to the direction of the guide.

K. Karl Kuller
INVENTOR.
BY John F. Miller
Agent
John M. Pease
Attorney

K. Karl Kuller
INVENTOR.
BY John F. Miller
Agent
John M. Pease
Attorney

LOW-SPEED HIGH-FREQUENCY TAPE RECORDER WITH RECIPROCATING HEAD AND MEDIUM

Background of the Invention

The invention is in the field of magnetic recording. In the prior art, recorders have been lacking in storage capacity, for example a common tape recorder operating at a tape speed of 7.5 inches per second provides a 15 kc. bandwidth and has a playing time of 32 minutes. Expedients designed to overcome these limitations, such as multiple head rotary drums, are both expensive and complex. Applicant overcomes this problem of the prior art by providing a novel reciprocating recording head to provide greater bandwidth and make slower tape speeds and longer playing time possible.

SUMMARY OF THE INVENTION

Figure 1:
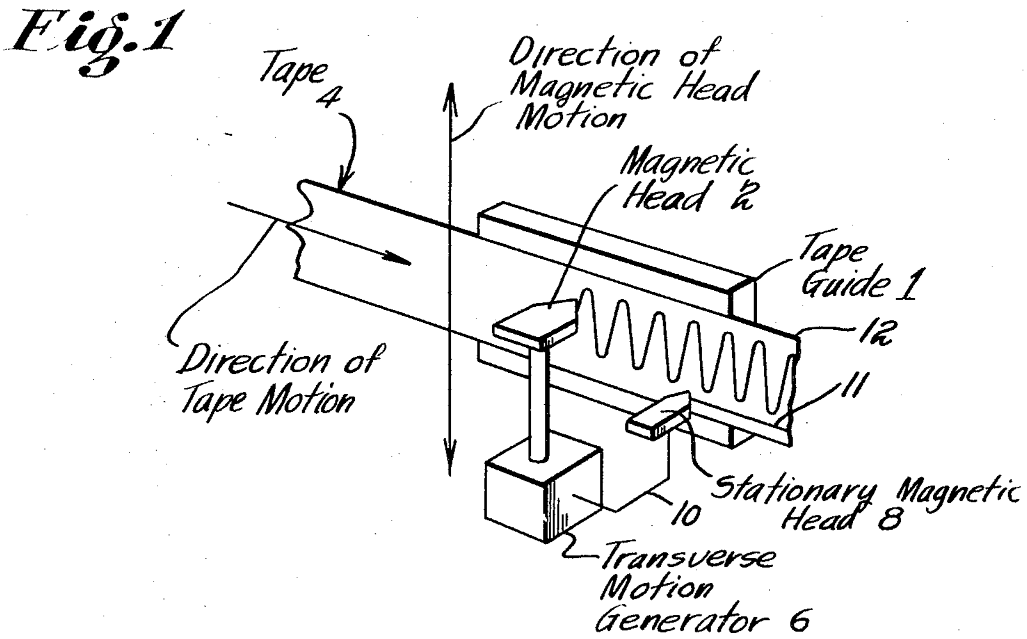
Figure 2:
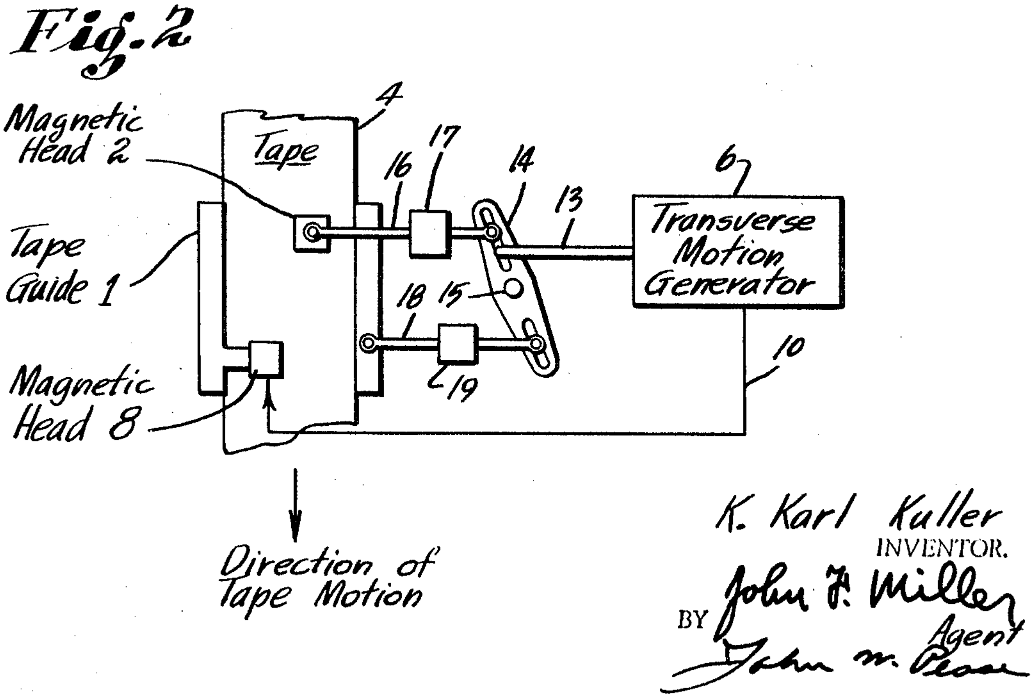
Figure 3:
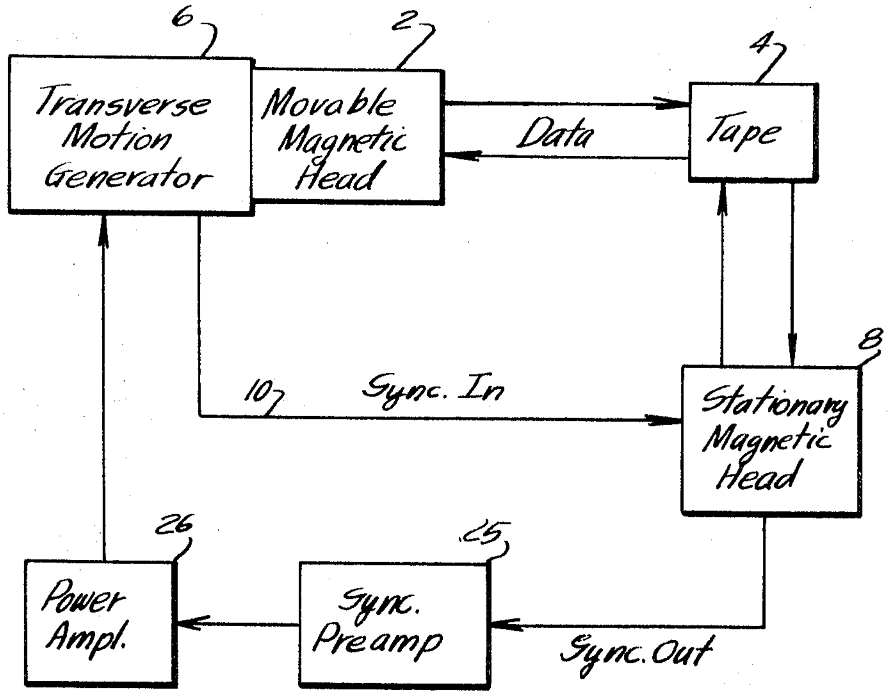

Means are provided to move a record-read head rapidly across a tape in a direction normal to the direction of tape travel with a vibratory motion. A synchronizing track may be recorded on the tape by a stationary head which records in synchronism with the vibrator mechanism. This synchronizing track may be read by the stationary head at playback and the output used to control the vibratory motion of the reciprocating head. Brief Description of the Drawing FIG. 1 shows the invention. FIG. 2 shows a modified embodiment of the invention. FIG. 3 is a functional block diagram of the invention. Description of the Preferred Embodiment The apparatus of the invention is shown in FIG. 1. Here a tape recorder comprising a tape guide 1 and a movable magnetic recording head 2 are located so that the tape guide assembly positions a tape 4 which travels in the direction indicated by the arrow. Head 2 can move across the face of tape 4 in a direction normal to the direction of tape travel as shown by the arrows adjacent head 2. Head 2 is driven back and forth across the face of tape 4 with a reciprocating motion by a transverse motion generator 6. Alternatively tape guide 1 could be reciprocated and head 2 could be fixed. A stationary head 8 is fixed to a support not shown and is connected to transverse motion generator 6 by a lead 10.

The motion of head 2 with respect to tape 4 when both head and tape are moving traces a sinusoidal path 12 on tape 4 as shown. The sinusoidal excursions of path 12 are shown having a much lower frequency than is actually the case, for clarity of illustration. Stationary head 8 will record a synchronizing track 11 on tape 4.

Transverse motion generator 6 may be any suitable device, for example a motor driven mechanical reciprocating apparatus or an electromagnetic vibrator. It is mechanically linked to head 2 by a member 3 to impart reciprocating movement thereto.

Alternatively, transverse motion generator 6 may be linked to both magnetic head 2 and tape guide assembly 1 to impart reciprocatory motion to both, as is shown in FIG. 2. Here transverse motion generator 6 is connected to a member 14 by a link 13 pinned to 14 as shown. Member 14 is pivoted at 15 to a fixed support, not shown. Pivoted member 14 is connected to head 2 by a link 16 and to tape guide assembly 1 by a link 18. Links 13, 16, and 18 are pinned through slots in 14 which oscillates around point 15 while the links reciprocate with a straight line motion. Links 16 and 18 are supported by fixed guides 17 and 19. Therefore, the motion generated by 6 is imparted to 1 and 2 through pivoted member 12 in such manner that 1 and 2 travel in opposite directions simultaneously so that the relative movement between 1 and 2 is additive. Thus the effective scanning speed is increased. Magnetic head 8 is fixed to tape guide assembly 1 as shown. The mechanism of FIGS. 1 and 2 is shown to illustrate the principles of the invention. It should be understood that any of the more sophisticated motion inducing mechanisms which are known in the art may be used.

Lead 10 connecting the transverse motion generator 6 to stationary head 8 enables synchronization of recording and readout operations without resorting to the expensive synchros and phase-comparison speed-control circuits of the prior art. The driving voltage of generator 6 or a suitable function thereof can be applied to head 8 over line 10 to record a synchronizing frequency on track 11 on tape 4 when the apparatus is recording. During playback or reproduce operations, track 11 is scanned by head 8 and the synchronizing frequency can be used to drive generator 6. This frequency can be modified as desired and also be used to synchronize the movement of tape 4.

FIG. 3 shows functional block diagram of a practical embodiment of the invention. The drawing is self-explanatory and differs from !FIG. 1 only in a showing of a preamplifier 25 and a power amplifier 26 in the synchronizing connection between stationary head 8 and transverse motion generator 6.

Some characteristics attainable with the invention are listed in the following table. The recording times are based on a 7 inch reel with 1200 feet of tape:

| Data lines per inch | Transverse frequency, c.p.s. | Longitudinal tape speed, i.p.s. | Effective tape speed, i.p.s. | H-F limit, kc. | Recordings time, hrs |
|---|---|---|---|---|---|
| 800 | 400 | 1 | 200 | [1] 1 | 4 |
| 400 | 200 | 1 | 100 | 500 | 4 |
| 200 | 100 | 1 | 50 | 250 | 4 |
| 100 | 50 | 1 | 25 | 125 | 4 |
| 200 | 50 | 0.5 | 25 | [2] 125 | 8 |
| 400 | 50 | 0.25 | 25 | [2] 125 | 16 |

[1] Megacycles.

[2] Since the effective tape speed is inversely proportional to the frequency of the transverse motion, the bandwidth is not affected as long as the maximum number of data lines per inch is not exceeded.

The short term dropouts at the peaks and valleys of the sinusoidal track 12 (when the tape movement is aligned with, rather than perpendicular to, the head gap) can be synchronized with the storage of data.

What I claim is:

1. In a recorder, the improvement comprising: means for moving a recording medium past a recording head in a first direction; means for simultaneously moving said recording head in a second direction perpendicular to said first direction and in the plane of the recording medium, so that the relative motion between said recording medium and said recording head describes a sinusoidal path on said recording medium; a stationary recording head for recording a synchronizing track on said recording medium; and means for moving said recording medium in a direction parallel and opposite to said second direction.

2. The apparatus of claim 1, wherein said stationary head is fixed to said means for moving said recording medium so that said stationary head remains fixed with respect to movement of said recording medium in said direction parallel and opposite to said second direction.